United States Patent [19]
Chen

[11] Patent Number: 6,034,670
[45] Date of Patent: *Mar. 7, 2000

[54] CURSOR POSITIONING APPARATUS

[76] Inventor: Mei Yun Chen, Fl. 3, No. 2, Lane 42, Hou Kang St., Shih Lin District, Taipei, Taiwan

[*] Notice: This patent is subject to a terminal disclaimer.

[21] Appl. No.: 08/720,472

[22] Filed: Sep. 30, 1996

[51] Int. Cl.[7] ...................................................... G09G 5/08
[52] U.S. Cl. ........................... 345/163; 345/156; 345/157; 345/168
[58] Field of Search ..................................... 345/163, 165, 345/166, 156, 157, 161, 168

[56] References Cited

U.S. PATENT DOCUMENTS

| | | | |
|---|---|---|---|
| 4,670,743 | 6/1987 | Zemke | 345/157 |
| 5,086,296 | 2/1992 | Clark | 345/157 |
| 5,327,162 | 7/1994 | Soma | 345/156 |
| 5,488,392 | 1/1996 | Harris | 345/168 |
| 5,704,037 | 12/1997 | Chen | 345/157 |

*Primary Examiner*—Jeffery A. Hofsass
*Assistant Examiner*—John Tweel, Jr.
*Attorney, Agent, or Firm*—David and Raymond; Raymond Y. Chan

[57] ABSTRACT

This is an improvement of a cursor positioning apparatus for a computer display device which includes an upper case, a center body and a lower case. It controls the movement and positioning of a cursor through the sliding movement of X-axis and Y-axis. There are also photo electric components for detecting the movement of photo grid and the displacement of the sliding bar in X-axis and Y-axis. The sensing signals are sent to a control circuit board and computer for further processing. The present invention may further have a curve-shaped slot in the upper case engaging with a square center pillar in the center body. The center pillar further engages with the lower case, and thus becomes an integral part of a keyboard. The present invention can be rotationally operated about a fixed axis point. A user can use hand and wrist to control the movement and positioning of the cursor on a display device without moving the arm. It is better ergonomically designed and structured than the conventional mouse.

19 Claims, 12 Drawing Sheets

CURSOR POSITIONING APPARATUS

BACKGROUND OF THE INVENTION

1. Field of the Invention

This invention relates to an improvement to a cursor positioning apparatus and particularly to a cursor positioning apparatus for computer display that can be rotationally operated about a fixed axis.

2. Description of the Prior Art

Conventional cursor control means used in the computer display usually includes keyboard, mouse, track ball, touch screen, light pen, etc. They are not very convenient for cursor movement and positioning. The keyboard has very low efficiency in cursor moving function. The movement of a mouse on the top of a table usually requires a user to move the wrist, forearm and upper arm. It is not ergonomically desirable. Too much movement of arm by using the mouse may also cause pain in the arm.

SUMMARY OF THE INVENTION

In order to overcome the aforesaid disadvantages, there should be disclosure of the absolute coordinates positioning apparatus. The applicant has submitted a patent application titled "Mechanical Optical Type Absolute Coordinates Cursor Positioning Apparatus" (1), (2) "in Taiwan (R.O.C.) under patent application Ser. Nos. 84 205 828 and 84 205 829. A patent application of improvement also filed to PCT under PCTCN 950042 and PCTCN 950043.

The applicant further submitted a patent application in Taiwan under patent application Ser. No. 84217771 titled "Cursor Positioning apparatus". The present invention is an improvement based on the aforesaid Taiwan Patent application number 84217771.

The first and second embodiments of the present invention can be rotationally operated to control the position of a cursor on a computer display screen. A user does not need to move the arm. It is better ergonomically designed, convenient and easy to use.

The third embodiment of the present invention can be rotationally operated on a field axis and can be integrated with a keyboard. The wrist of a user may be held stationary when in use. There is no arm movement. It is also better ergonomically designed, simple and easy to use. All the embodiments of this innovation effectively resolve the problems of the conventional mouse operation.

BRIEF DESCRIPTION OF THE DRAWINGS

The present invention, as well as its many advantages, may be further understood by the following detailed description and drawings in which.

DETAILED DESCRIPTION OF THE PREFERRED EMBODIMENT

Figures 1A, 1B:
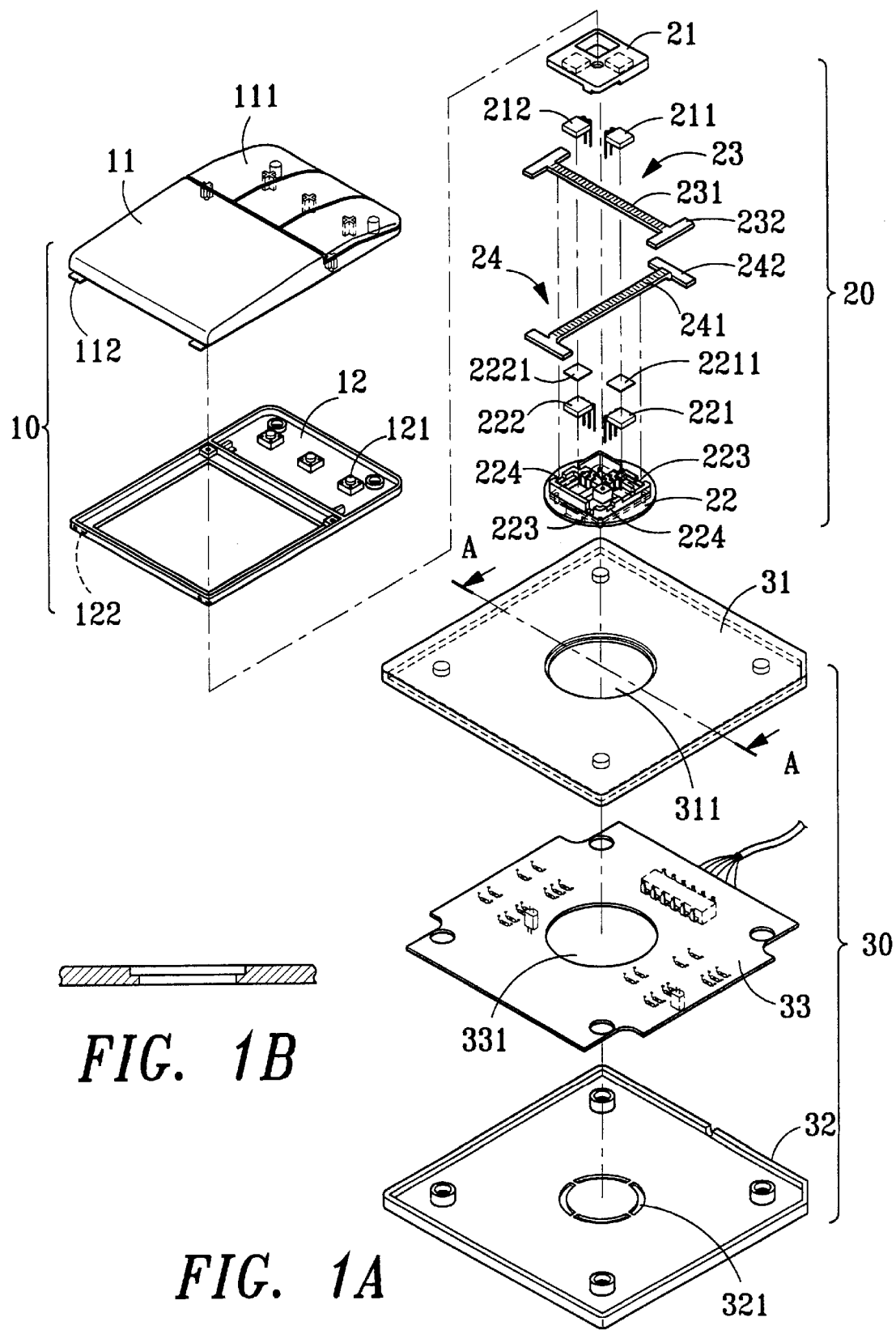
FIG. 1A is an exploded view of a first embodiment of the present invention.
FIG. 1B is a sectional view along sectional line A—A in FIG. 1A.
Figure 2:
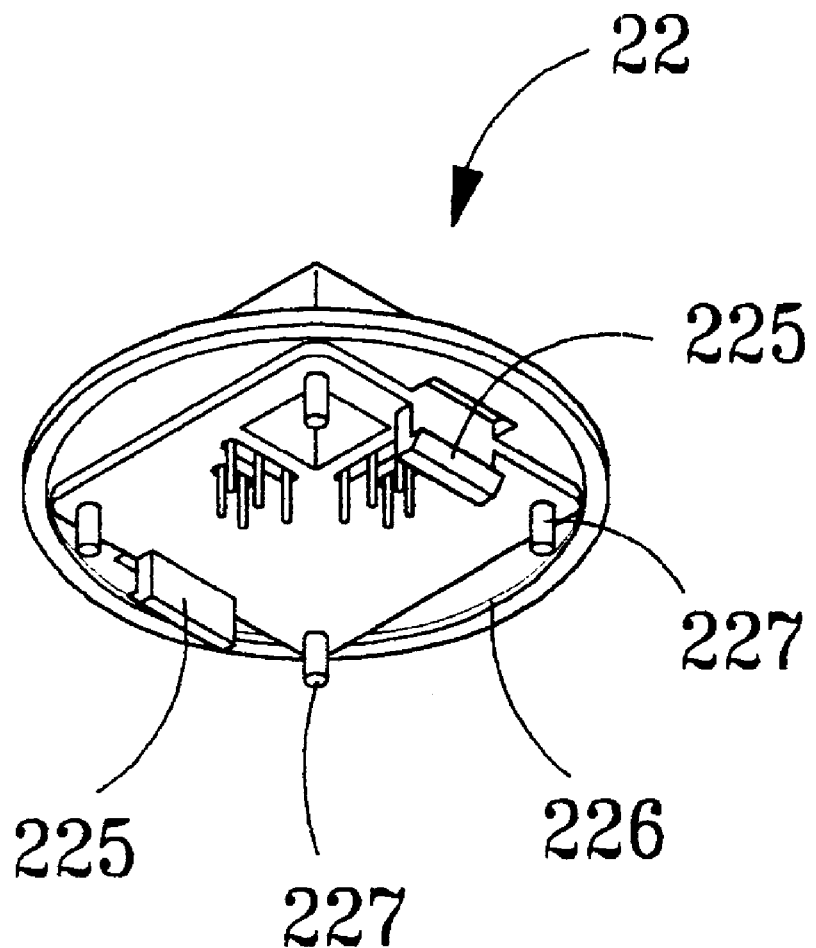
FIG. 2 is a perspective view of a base of the first embodiment of the present invention.
Figure 3:
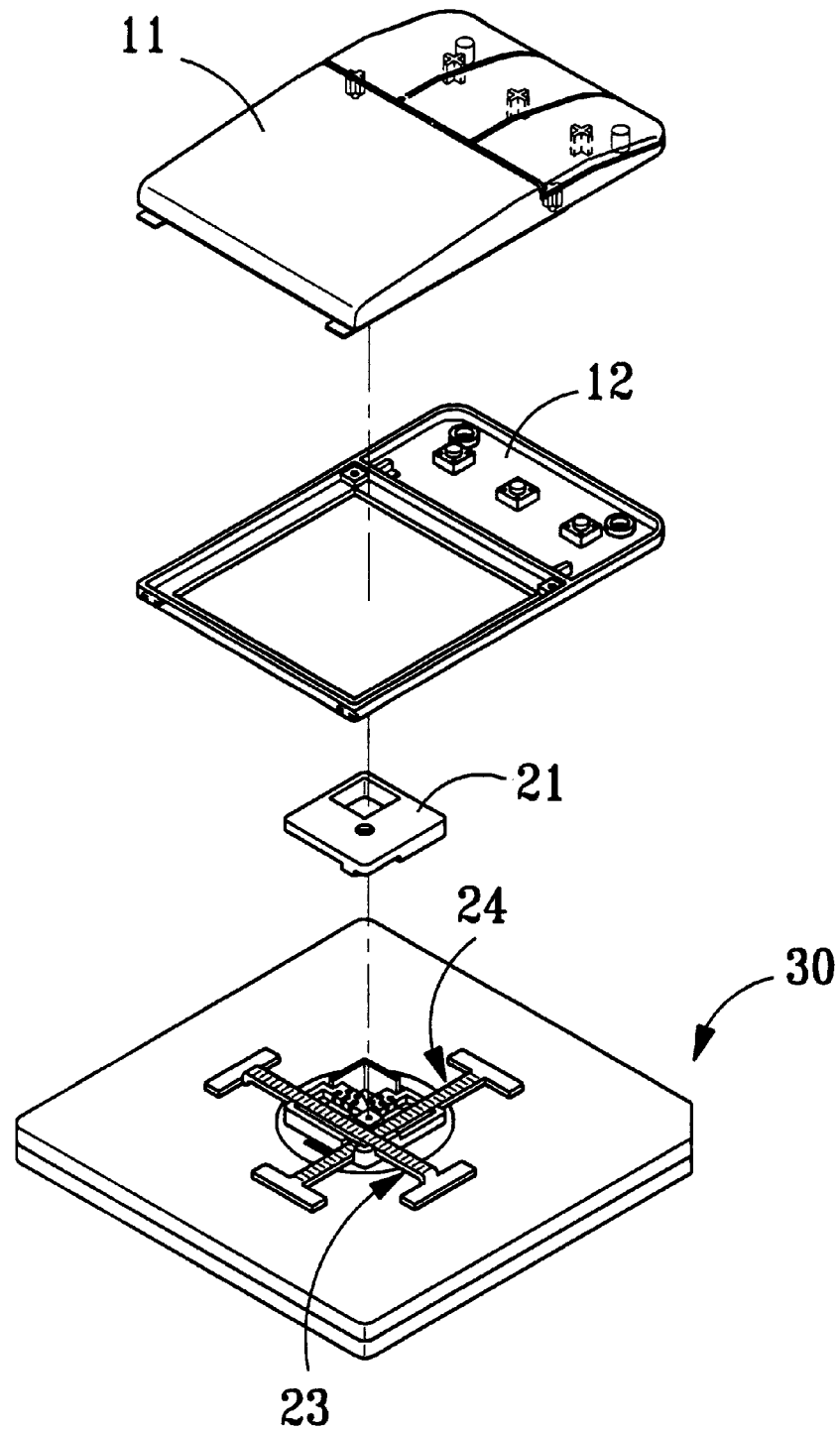
FIG. 3 is a fragmentary exploded view of the first embodiment.
Figure 4:
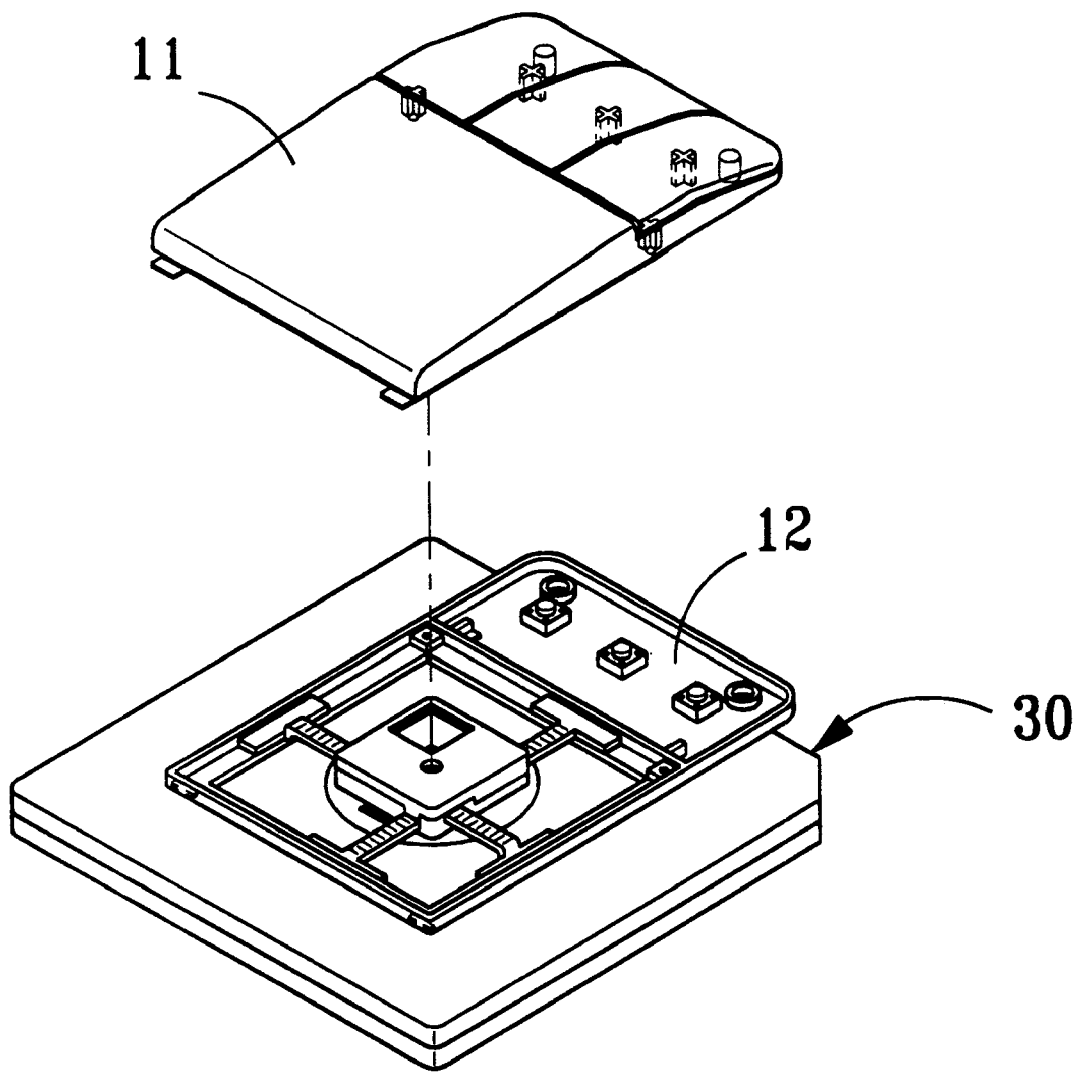
FIG. 4 is another fragmentary exploded view of the first embodiment.
Figure 5:
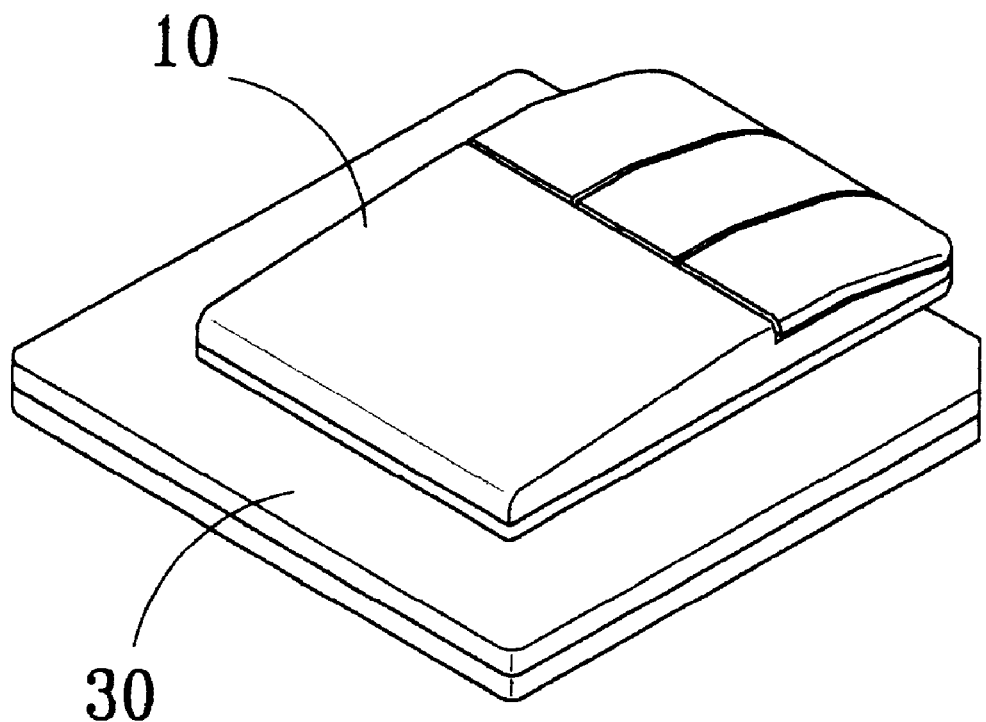
FIG. 5 is a fragmentary perspective view of the first embodiment.

Referring to FIGS. 1 to 5, the first embodiment of the present invention includes an upper case 10, a center body 20 and a lower case 30.

The upper case 10 includes a upper case cover 11 and an upper case base board 12. The upper case cover 11 has three input keys 111 located in the left, center and right positions respectively and a pair of locking lugs 112 for engaging with a pair of locking slots 122 located in the upper case base board 12 respectively. The upper case base board 12 further has three contact switches 121 located under the three input keys 111 respectively.

The center body 20 includes a cover 21 and a base 22 which has a circular disk bottom and has an engaging means for locking the cover 21. Between the cover 21 and the base 22, there are provided with a X-axis sliding bar 23 and a Y-axis sliding bar 24 which are served respectively as a Y-axis movable photo grid and a X-axis movable photo grid. On the X-axis movable photo grid 23, there is a transparent wherein non-transparent X-axis photo grid zone 231, and a X-axis sliding block is provided 232 on each of the two ends. The Y-axis movable photo grid 24 also has a transparent and non-transparent Y-axis photo grid zone 241, wherein two Y-axis sliding blocks 242 are provided at both ends respectively. Inside the cover 21, there are two light emitting diodes 211, 212. In the base 22, there are a X-axis photo transistor 221 and a Y-axis photo transistor 222, each of which has respectively a stationary photo grid 2211 and 2221 disposed thereon. In an upward peripheral flange on the base 22, there are two pairs of U-shaped slots 223 and 224 allowing the X-axis movable photo grid 23 and the Y-axis movable photo grid 24 to slide therethrough respectively. Under the base 22, there are snap hooks 225.

The lower case 30 includes a lower case cover 31 and a lower case base board 32 with a control circuit board 33 located therebetween and screwed together. The lower case cover 31 and the circuit board 33 have a circular opening 311 and 331 formed in the center. The circuit board 33 has electronic components such as resistor, capacitor, inductor, transistor and integrated circuit (IC) disposed thereon. The four corners of the circuit board 33 are cut away to form notches. The lower case base board 32 has a plurality of curve-shaped concave slots 321 to form a substantially annular ring.

When in use, the X-axis sliding bar 23 and the Y-axis sliding bar 24 can be sildably moved respectively through the slots 223 and 224 without interfering with each other as shown in FIG. 1 A—A of the slots cross section. The lower case cover 31 also has a circular opening 311 in the center. The circular opening 311 has a smaller diameter at the lower portion than the upper portion.

The circular disk base 22 is disposed in the circular opening 311 and the top surface of the disk is equal to or lower than the top surface of the lower case cover 31. The disk base 22 further has a protrusive circular body 226 formed below the bottom surface for reducing the friction when the disk base 22 is rotating. The snap hook 225 under the disk base 22 can engage with the opening 311 and thus preventing the base 22 from separating with the lower case cover 31. The bottom of the hooks 225 may be slidably moved in the concave slot 321 of the lower case base board 32. Under the disk base 22, there are a plurality of studs 227 which can be slidably moved in the concave slot 321. Thus the concave slot 321 of the lower case base board 32 may be used to control the rotation angle of the center body 20.

As an alternative, the stud 227 may be disposed on the lower case base board 32 while the concave slot 321 may be formed under the bottom of the disk base 22 of the center body 20.

The first embodiment set forth above thus may be rotationally operated for controlling the position of the cursor on a computer display screen. A user does not need to move the arm to control the cursor movement. It is better ergonomically designed, and simpler and easier to use than conventional mouse.

Figure 6:
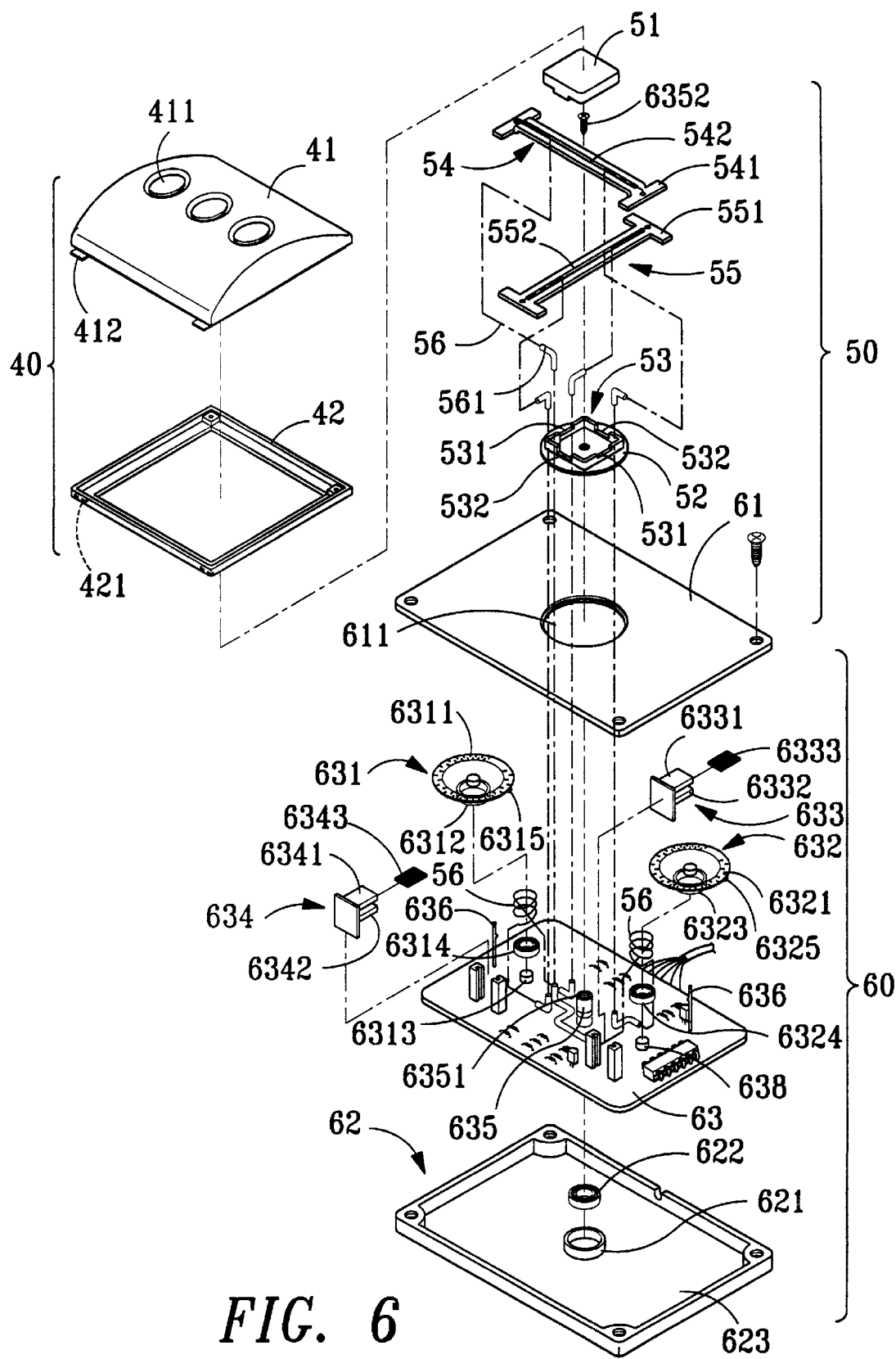
FIG. 6 is an exploded view of a second embodiment of the present invention.
Figure 7A:
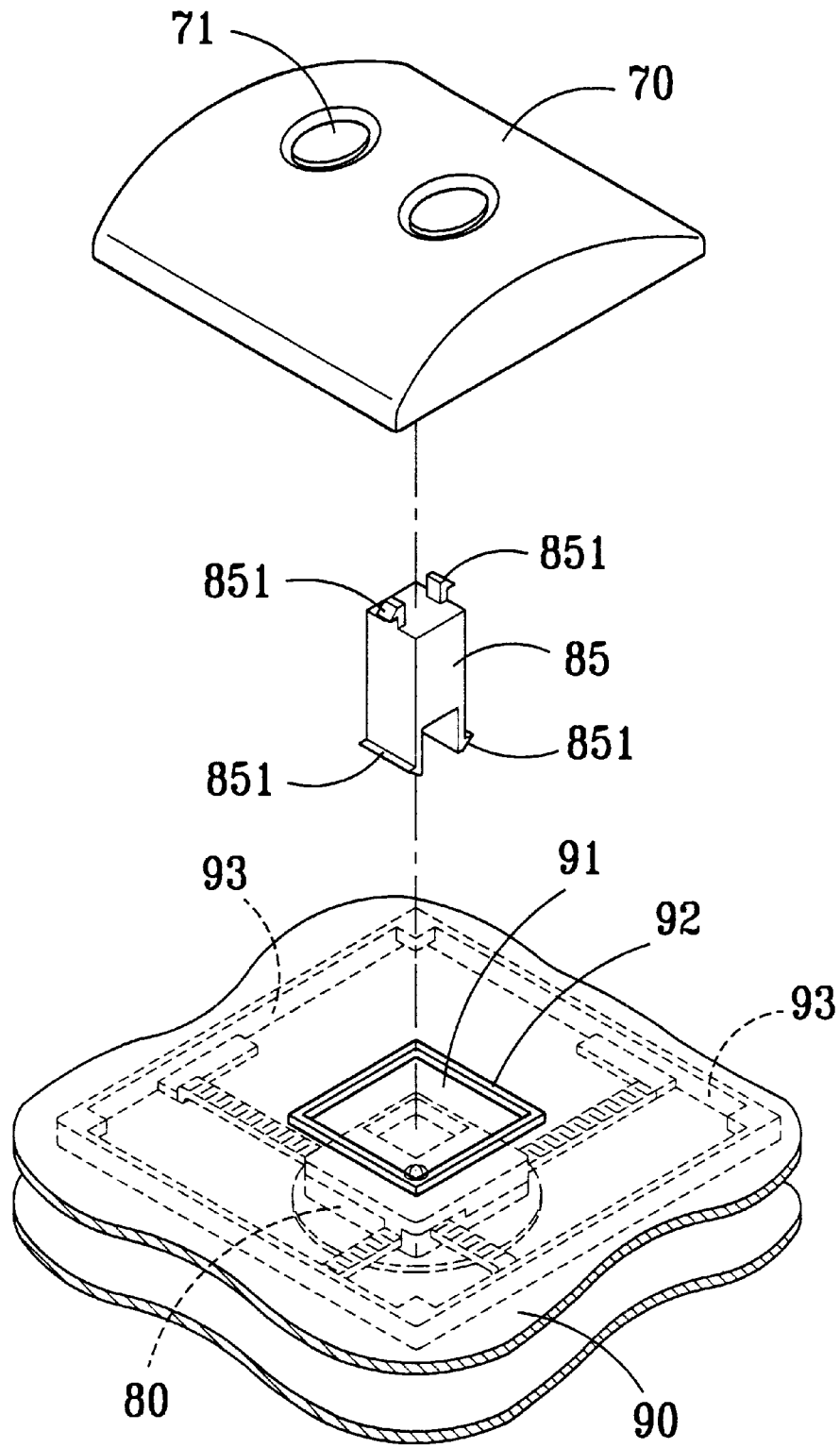
FIG. 7A is a fragmentary exploded view of a third embodiment
Figure 7B:
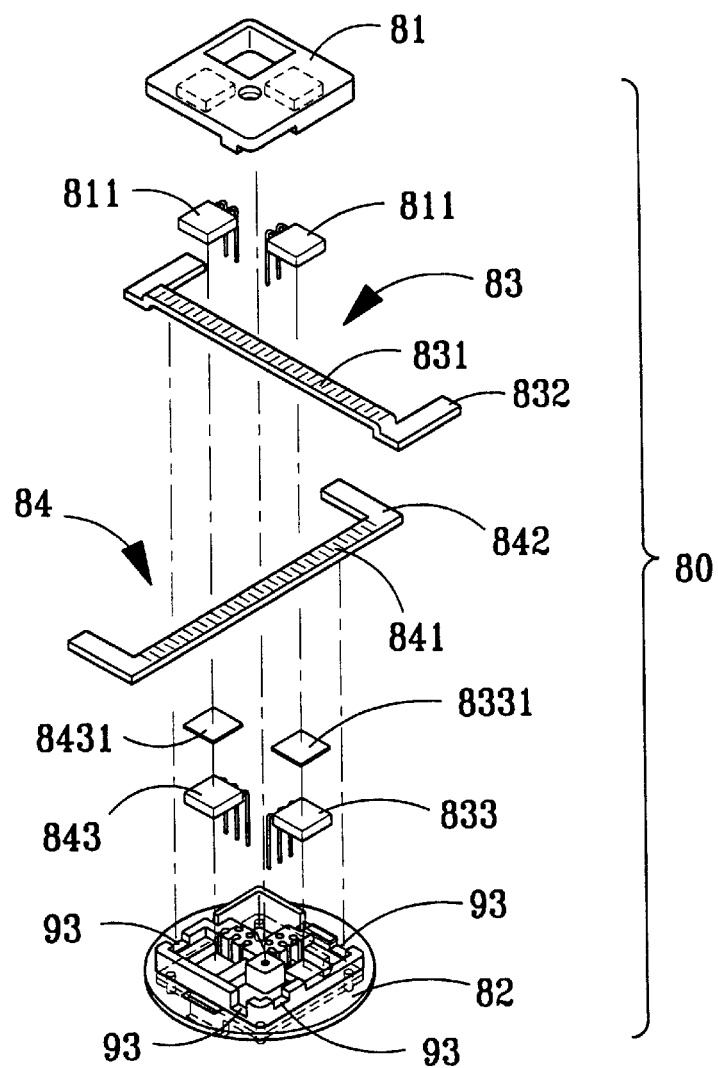
FIG. 7B is an exploded view of a center body of a third embodiment.
Figure 7B:
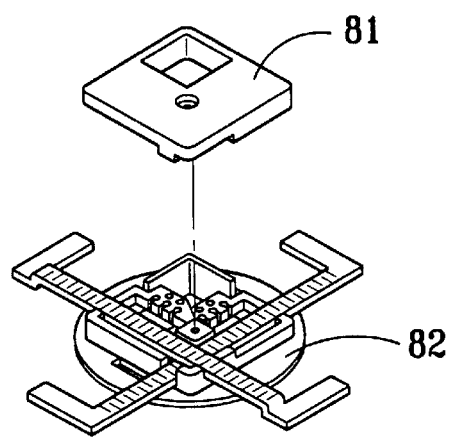
Figure 8:
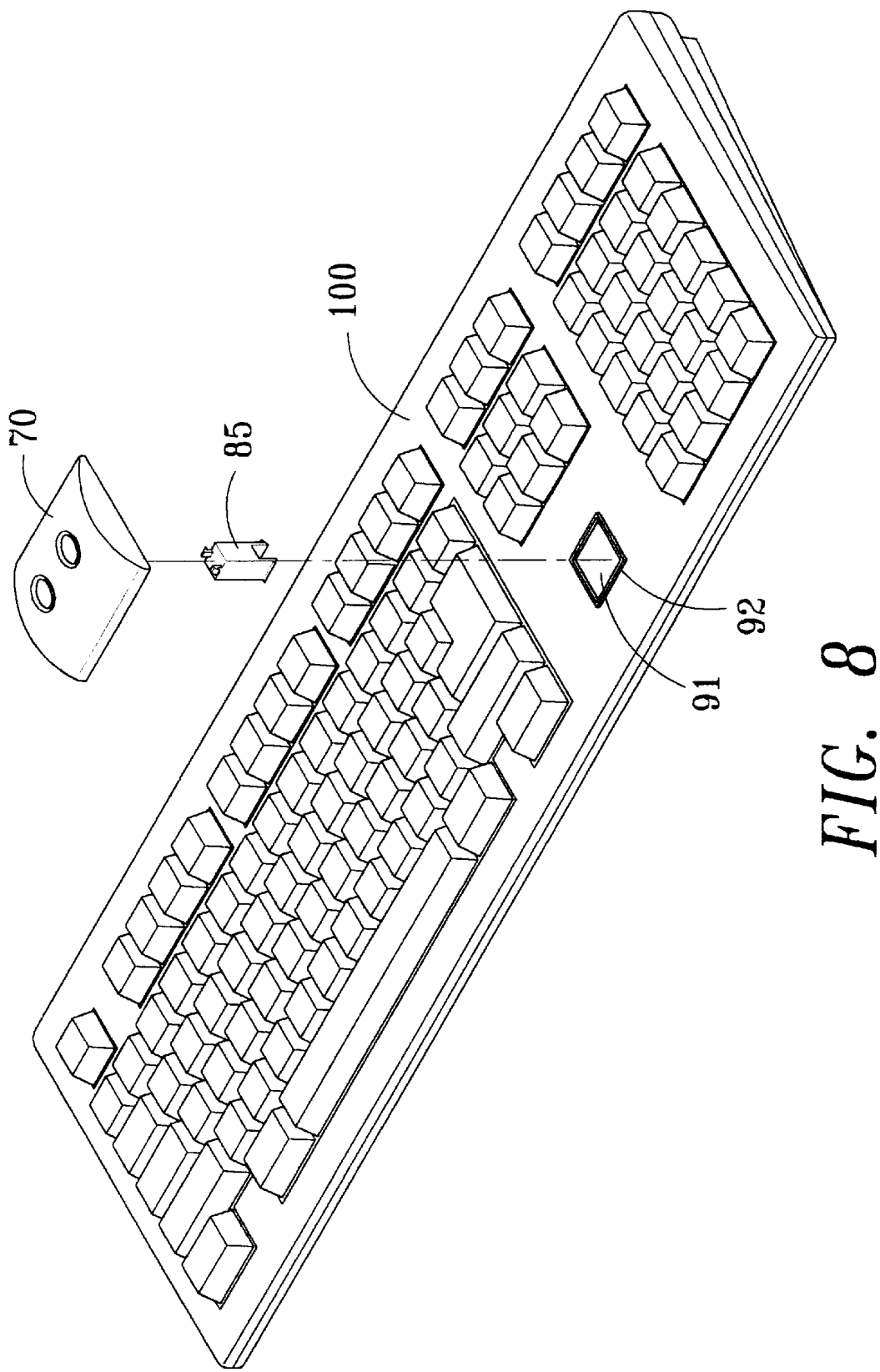
FIG. 8 is a fragmentary perspective view of the third embodiment.
Figure 9:
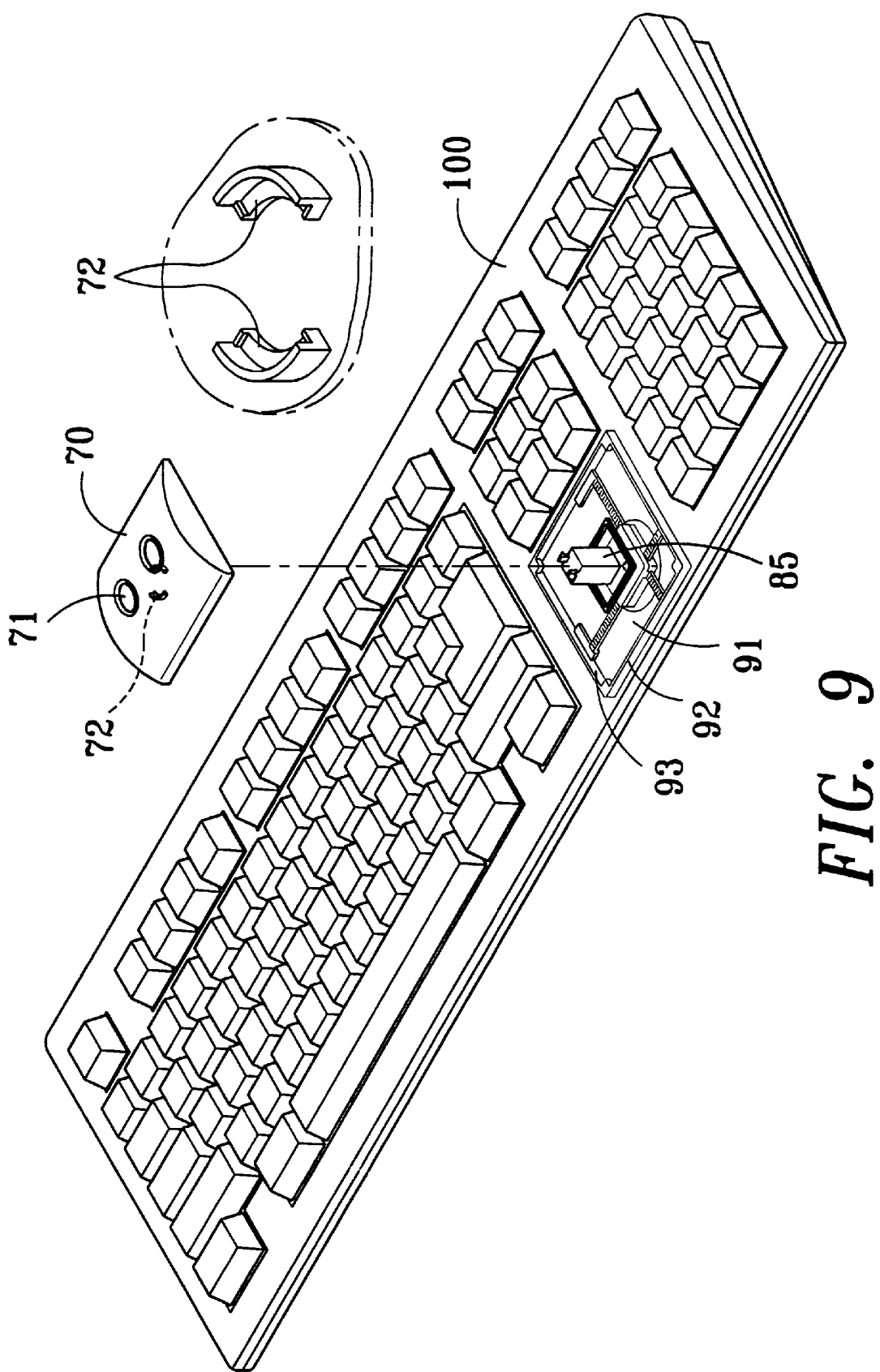
FIG. 9 is a perspective view of the third embodiment.
Figure 10:
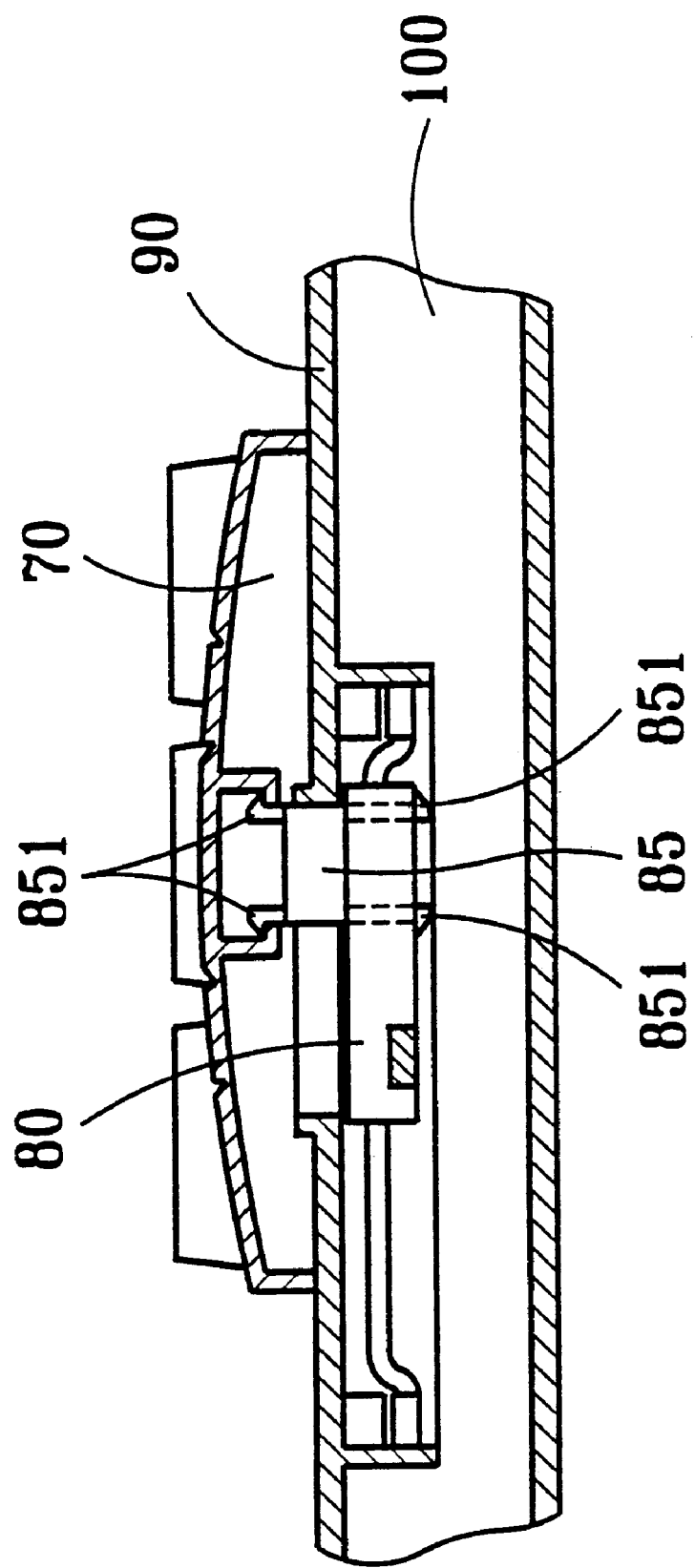
FIG. 10 is a fragmentary section view of the third embodiment.
Figure 11:
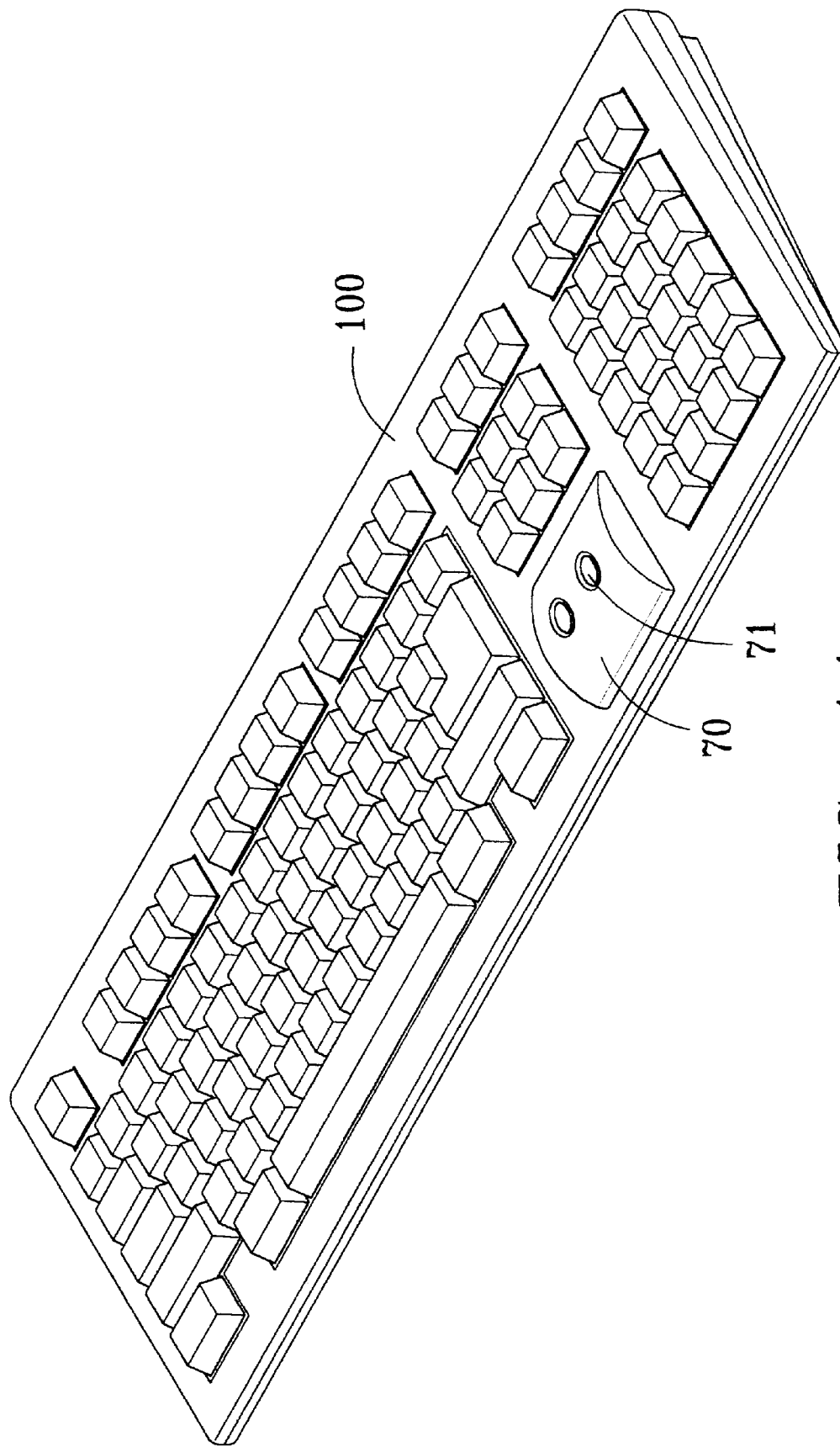
FIG. 11 is a perspective view of the third embodiment after assembled.

FIG. 6 shows the second embodiment of the present invention. It includes an upper case 40, a center body 50 and a lower case 60. The upper case 40 includes an upper case cover 41 and an upper case base board 42. The upper case 41 has three input keys 411 aligning in left, center and right, and a pair of locking lugs 412 engageable with a pair of locking slots 421 located in the upper case base board 42.

The center body 50 includes a cover 51 which is formed in substantially square shape and a base 52 which has concave slot means 53 on the top engageable with the cover 51, and a circular disk at the bottom.

The concave slot means 53 has four peripheral upward flanges each has a slot 531,532 formed therein respectively and facing each other. Between the cover 51 and the base 52 there is a X-axis sliding bar 54 slidably moveable through the slots 531, and, a Y-axis sliding bar 55 slidably moveable through the slots 532. Each of the X-axis sliding bar 54 and the Y-axis sliding 55 has a pair of sliding blocks 541 and 551 at two ends thereof and has respectively a linear slot 542 and 552 formed in the top axially for housing a rope 56 therein.

The X-axis sliding bar 54 and Y-axis sliding bar 55 are linked respectively via the rope 56 to a X-axis movable photo grid 631 and a Y-axis movable photo grid 632 located in a control circuit board 63. The rope 56 is shielded in a protection tube 561.

The lower case 60 includes a lower case cover 61 and a lower case base board 62 with the control circuit board 63 located therebetween. The lower case cover 61 and the lower case base board 62 are screwed together. The lower case base board 62 has a bearing 622 housed in a bearing seat 621 located in the center of the bottom and has a concave bottom space 623 for housing the control circuit board 63.

The control circuit board 63 includes the X-axis movable photo grid 631 which has a transparent and non-transparent photo grid zone 6311 located therein, and a hollow shaft 6312 concentrically disposed thereon. The hollow shaft 6312 has the rope 56 winds around thereof for rotating the X-axis movable photo grid 631. The hollow shaft 6312 is engaged with a shaft 6313 and a bearing 6314 located on the control circuit board 63.

The control circuit board also includes the Y-axis movable photo grid 632, a X-axis photo electric means 633, a Y-axis photo electric means 634, a spindle 635, resistor, capacitor, inductor, transistor and IC components, etc.

The Y-axis movable photo grid 632 has transparent and non-transparent photo grid zone 6321 located therein, and a hollow shaft 6322 concentrically disposed thereon. The hollow shaft 6322 has the rope 56 winds around thereof for rotating the Y-axis movable photo grid 632. The hollow shaft 6322 is engaged with a shaft 6323 and a bearing 6324 located on the control circuit board 63.

The X-axis photo electric means 633 has a light emitting diode 6331 located thereabove and a photo transistor 6332 located therebelow. The photo transistor 6332 has a stationary photo grid 6333 disposed thereon. The photo electric means 633 further has a central slot formed therein for the Y-axis movable photo grid 632 to slide therethrough.

The Y-axis photo electric means 634 has a light emitting diode 6341 located thereabove and a photo transistor 6342 located therebelow. The photo transistor 6342 has a stationary photo grid 6343 disposed thereon. The photo electric means 634 further has a central slot formed therein for the X-axis movable photo grid 631 to slide therethrough.

The spindle 635 has a screw hole 6351 in the center for screwing the base 52 of the center body 50 thereon with a screw 6352. The spindle 635 engages with the bearing 622 and bearing seat 621 of the lower case base board 62.

When in use, the X-axis sliding bar 55 and the Y-axis sliding bar 54 can be placed in the slots 531 and 532 of the concave slot means 53 respectively without interfering with each other. The lower case cover 61 has a circular opening 611 in the center which has a smaller diameter in the lower portion than the upper portion. The rope 56 is fixedly engaged with the hollow shafts 6312 and 6322 of the X-axis movable photo grid 631 and Y-axis movable photo grid 632.

The movable photo grids 631 have respectively bulges 6315 and 6325 located on the peripheral rim thereof. The control circuit board 63 has a pair of stopper studs 636 for controlling the movable photo grids 631, 652 to rotate within a full circle.

As an alternative, the bulges 6315 and 6325 may be located on the hollow shafts 6312 and 6322 of the movable photo grid, thus the stoppers studs 636 on the control circuit board may control the movable photo grid 631 and 632 to rotate within one full circle.

The second embodiment set forth above uses a rope to rotate the X-axis and Y-axis movable photo grids, and thus can reduce the size of the movable photo grids and the overall size of the cursor positioning apparatus. This embodiment uses rotational operation to control the cursor movement and positioning. A user does not have to move the arm to perform cursor operation. It is therefore better ergonomically designed, and simpler and easier to use than conventional mouse.

FIGS. 7 through 11 illustrate the third embodiment of the present invention. It includes an upper case 70, a center body 80 and a lower case 90.

The upper case 70 for preventing dust from entering into the keyboard has a plural number of input keys 71 located therein and a pair of curve-shaped engaging slots 72 formed inside.

The center body 80 including a cover 81 and a base 82 which has a circular disk bottom. The cover 81 and base 82 may be engaged together. Between the cover 81 and base 82, there are provided with a X-axis sliding bar 83 and a Y-axis sliding bar 84 for serving respectively as a X-axis movable photo grid and Y-axis movable photo grid which have respectively transparent and non-transparent photo grid zone 831 and 841 formed therein. The movable photo grids 83 and 84 further have respectively a pair of sliding blocks 832 and 842 located at both ends thereof. In the cover 81, there are a pair of light emitting diodes 811. In the base 82 there are a X-axis photo transistor 833 and a Y-axis photo transistor 843 which have respectively a stationary photo grid 8331, 8431 disposed therein. The base 82 has upward peripheral flanges which have two pairs of U-shaped slots 821 symmetrically facing each other and allowing the X-axis and Y-axis movable photo grids 83 and 84 to slide there through. The center body 800 has a square center pillar 85 runs through thereof. The center pillar 85 has a pair of snap hooks 851 located respectively on the top and bottom for engaging respectively with a pair of engaging slots 72 in the upper case 70 and the base 82 of the center body 80.

The lower case 90 located below the right portion of a keyboard 100 and becomes a part of the keyboard 100.

The lower case 90 has a square opening 91 which has upward flange 92 around the opening 91 for guiding the movement of the center body 90 and to prevent fluid such as drink, coffee, milk from flowing into the keyboard. Inside the lower case 90, there are provided with grooves 93 for allowing the photo grid zones 831 and 841 of the movable photo grids 83, 84 to slide therein.

The third embodiment set forth above enables the cursor positioning apparatus be integrally structured with the keyboard. The engaging slots 72 can control the rotational angle of the upper case 70 within 180 degrees. The moving range of the center pillar 85 is within the range of 1.8 mm ×2.5 mm, and thus greatly reducing the moving space which otherwise would be needed for a mouse.

The third embodiment set forth above uses a fixed axis rotation point for control the moving and positioning of the cursor. A user can use hand and wrist rather than arm for operation. It is much better engonsmically designed than conventional mouse, and is much more simple and easy to use.

It may thus be seen that the objects of the present invention set forth herein, as well as those made apparent from the foregoing description, are efficiently attained, while the preferred embodiments of the present invention have been set forth for purpose of disclosure. Modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A cursor positioning apparatus, comprising:
    an upper case including an upper case cover which has a left, a center and a right input key and a locking lug, and an upper case base board which has three contact switches located under the input keys and a locking slot engageable with the locking lug;
    a center body including a cover having within which two light emitting diodes, a base engageable with the cover having a circular disk at a bottom which has snap hook disposed thereunder, a X-axis sliding bar, which is a X-axis movable photo grid located between the cover and the base, having a transparent and non-transparent photo grid zone formed therein and two sliding blocks respectively located at both ends thereof, a Y-axis sliding bar which is a Y-axis movable photo grid located between the cover and the base, having a transparent and non-transparent photo grid formed therein and two sliding blocks respectively located of both ends thereof, wherein the base has a X-axis photo transistor and a Y-axis photo transistor, each having a stationary photo grid disposed thereon, the base further having upward peripheral flanges with two pairs of U-shaped slots symmetrically formed therein and facing each other and enabling the X-axis and Y-axis movable photo grids to slide therethrough; and
    a lower case including a lower case cover which has a circular opening in the center, a lower case base board which has a plurality of curve-shaped concave slots forming an annular ring in the center, and a control circuit board screwed between the lower case cover and the low case base board, wherein the control circuit board has a circular opening in the center, cut away notches at the four corners respectively and a plurality of electric components disposed thereon.

2. A cursor positioning apparatus, as recited in claim 1, wherein the X-axis and Y-axis movable photo grids are vertically placed in the pair of U-shaped slots respectively without interfering with each other.

3. A cursor positioning apparatus, as recited in claim 1, wherein a lower portion of the circular opening of the lower case cover has a smaller diameter then an upper portion of thereof.

4. A cursor positioning apparatus, as recited in claim 1, wherein the circular disk of the center body has a protrusive circular body below the bottom thereof for reducing friction when the circular disk rotates.

5. A cursor positioning apparatus, as recited in claim 1, wherein a top surface of the circular disk is not higher than the surface of the lower case cover when the circular disk is placed in the circular opening of the lower case cover.

6. A cursor positioning apparatus, as recited in claim 1, wherein the circular disk has snap hooks located thereunder, which are engageable with the circular opening of the lower case cover, and bottoms of the snap hooks are slidable in the concave slots of the lower case base board.

7. A cursor positioning apparatus, as recited in claim 1, wherein the circular disk has a plurality of studs located thereunder.

8. A cursor positioning apparatus, as recited in claim 7, wherein the studs are slidable in the concave slots of the lower case base board.

9. A cursor positioning apparatus, as recited in claim 8, wherein the concave slots of the lower case base board control the rotation angle of the center body.

10. A cursor positioning apparatus, as recited in claim 7, wherein the concave slots are formed under the bottom of the circular disk and the studs are located on the bottom surface of the lower case base board.

11. A cursor positioning apparatus, comprising
    an upper case including an upper case cover which has a left, a center and a right input key and a locking lug, and an upper case base board which has a locking slot engageable with the locking lug;
    a center body including a substantially square cover, a base which is engageable with the cover having a circular disk at a bottom and upward peripheral flanges forming two pairs of symmetrical U-shaped slots therein, a X-axis sliding bar which is located between the cover and the base having two sliding blocks located at both ends thereof and a linear slot axially formed on a top thereof for housing a rope therein, and a Y-axis sliding bar which is located between the cover and the base having two sliding blocks located at both ends thereof and a linear slot axially formed on a top thereof for housing the rope therein, wherein the rope is shielded by a tube; and a lower case including a lower case cover, a lower case base board having a bearing and a bearing seat located at a center of a concave bottom thereof, and a control circuit board screwed between the lower case cover and the lower case base board, wherein the control circuit board includes:

a X-axis movable photo grid having a transparent and non-transparent photo grid zone formed therein which has a hollow shaft concentrically located thereof winding the rope thereon for turning the X-axis movable photo grid, the hollow shaft engaging with a shaft and a bearing on the control circuit board;

a Y-axis movable photo grid having a transparent and non-transparent photo grid zone formed therein which has a hollow shaft concentrically located thereof winding the rope thereon for turning the Y-axis movable photo grid, the hollow shaft engaging with a shaft and a bearing on the control circuit board;

a X-axis photo electric means having a light emitting diode above a photo transistor which has a stationary photo grid disposed thereon, and a through slot for the X-axis movable photo grid to slide therein;

a Y-axis photo electric means having a light emitting diode above a photo transistor which has a stationary photo grid disposed thereon, and a through slot for the Y-axis movable photo grid to slide therein;

a spindle screwed with the lower case base board of the center body engaging with the bearing and the bearing seat of the lower case base board; and electric components including resistor, capacitor, inductor, transistor, and IC electrically connected.

12. A cursor positioning apparatus, as recited in claim 11, wherein the X-axis sliding bar and the Y-axis sliding bar are vertically placed in the symmetrical U-shaped slots without interfering with each other.

13. A cursor positioning apparatus, as recited in claim 11, wherein the lower case cover has a circular opening in a center and a diameter at a lower portion of the circular opening is smaller than that of an upper portion of the circular opening.

14. A cursor positioning apparatus, as recited in claim 11, wherein the rope is fixedly engaged with the X-axis and Y-axis movable photo grids.

15. A cursor positioning apparatus, as recited in claim 11, wherein each of the X-axis and Y-axis movable photo grids has bulges formed on a peripheral rim thereof for limiting the rotation of the respective X-axis and Y-axis movable photo grids within a full circle by a stopper stud located on the control circuit board.

16. A cursor positioning apparatus, as recited in claim 11, wherein the rope drives the X-axis and Y-axis movable photo grids in order to render the X-axis and Y-axis movable photo grids to be operated in a small size space.

17. A cursor positioning apparatus, as recited in claim 15, wherein the bulges are formed on the hollow shaft of each of the X-axis and Y-axis movable photo grids.

18. A cursor positioning apparatus, comprising
an upper case including a plurality of input keys and a curve-shaped engaging slot located inside for preventing dust form entering therein;

a center body including a cover which has two light emitting diodes located therein, a base engageable with the cover having upward peripheral flanges forming two pairs of symmetrical U-shaped slots therein, a X-axis sliding bar which is a X-axis movable photo grid having a transparent and non-transparent photo grid zone formed therein and two sliding blocks located at two ends thereof, a Y-axis sliding bar which is a Y-axis movable photo grid having a transparent and non-transparent photo grid zone formed therein and two sliding blocks located at two ends thereof, a X-axis photo transistor having a stationary photo grid disposed thereon, a Y-axis photo transistor having a stationary photo grid disposed thereon, and a square center pillar running through the center body having snap hooks on a top and bottom for engaging respectively with the upper case and the base of the center body, wherein the X-axis and Y-axis movable photo grids are slidably engaged with the symmetrical U-shaped slots of the base and the X-axis and Y-axis movable photo grids and the X-axis and Y-axis photo transistors are located between the cover and the base of the center body; and a lower case located below a right portion of a keyboard as an integral part thereof having a square opening and grooves formed inside for allowing the sliding blocks of the X-axis and Y-axis movable photo grids to move therein.

19. A cursor positioning apparatus, as recited in claim 18, wherein the curve-shaped engaging slot has an angle less than 180 degrees and controls the rotation angle of the upper case.

* * * * *